United States Patent [19]

Yamaguchi et al.

[11] Patent Number: 4,950,633

[45] Date of Patent: Aug. 21, 1990

[54] CATALYST FOR HYDROTREATING COAL LIQUEFACTION AND CIRCULATION SOLVENT

[75] Inventors: Toshio Yamaguchi, Tokyo; Kikoo Uekusa, Chiba; Naoto Kinbara; Eiji Funatsu, both of Ichikawa; Katsuzo Shiraishi, Inba; Yukuaki Mitarai, Kamagaya, all of Japan

[73] Assignee: Sumitomo Metal Mining Company Limited, Japan

[21] Appl. No.: 422,428

[22] Filed: Oct. 17, 1989

[30] Foreign Application Priority Data

Oct. 17, 1988 [JP] Japan .................... 63-259308

[51] Int. Cl.$^5$ .................... B01J 21/04; B01J 23/85; B01J 23/88
[52] U.S. Cl. .................... 502/314; 208/254 H
[58] Field of Search ............. 502/314; 208/254 H

[56] References Cited

U.S. PATENT DOCUMENTS 4,257,922  3/1981  Kim et al. .................... 502/314 X
4,472,528  9/1984  Berg et al. .................... 502/314 X

*Primary Examiner*—W. J. Shine
*Attorney, Agent, or Firm*—Watson, Cole, Grindle & Watson

[57] ABSTRACT

Disclosed is a catalyst for hydrotreating a coal liquefaction and circulation solvent, in which γ-alumina carrier carries at least one metal of Group VI of the Periodic Table in an amount of from 15 to 15% by weight as the oxide thereof and at least one metal of Group VIII of the same Table in an amount of from 3 to 10% by weight as the oxide thereof and the pore distribution as measured by mercury pressure porosimetry satisfies the conditions that the pores having a diameter of from 40 to 600 Å have a mean diameter of from 9 to 150 Å and the capacty of the pores having a diameter falling within the range of the mean diametr plus/minus 10 Å is 65% or more of the capacity of the pores having a diameter of from 40 to 600 Å. The catalyst is highly active for both hydrogenation and denitrogenation of coal-liquefying solvents.

6 Claims, No Drawings

CATALYST FOR HYDROTREATING COAL LIQUEFACTION AND CIRCULATION SOLVENT

FIELD OF THE INVENTION

The present invention relates to a new hydrotreating catalyst for coal liquefaction and circulation solvents.

BACKGROUND OF THE INVENTION

Basically, liquefaction of coal indicates a technology where coal is reacted with hydrogen under high-temperature and high-pressure condition, to convert high-condensed hydrocarbon compounds having a small atomic ratio of hydrogen to carbon into light, medium and heavy oil components composed of low-molecular weight hydrocarbon compounds having an atomic ratio of hydrogen/carbon. Various methods have heretofore been proposed for the liquefaction of coal. One typical method comprises blending a finely pulverized coal with a solvent to give a slurry, adding a powdery iron oxide or iron sulfide to the slurry as a catalyst and liquefying the resulting slurry at a temperature of from 430° to 460° C. and under a pressure of from 150 to 250 kg/cm$^2$ with the introduction of hydrogen. By the liquefying reaction, the hydrocarbon compounds constitution the coal receive hydrogen from the hydrogen-donating compounds in the solvent and from the hydrogen gas in the gaseous phase and are hydrogenolyzed and converted into liquid hydrocarbons. The liquid product thus formed is recovered as a coal-liquefied oil, while a part thereof, especially a part of the medium and heavy oil components (fractions of 220° to 538° C.), is recirculated as a solvent for the said coal-liquefying step, whereupon the recirculating solvent is hydrotreated so as to impart a hydrogen-donating capacity thereto. The hydrotreatment of such solvent is effected by introducing the medium and heavy oil components into a reactor column filled with a catalyst, together with hydrogen, and reacting the components with hydrogen under a high-temperature and a high-pressure. As the catalyst for the hydrotreatment, catalysts for purification of petroleum where a carrier of alumina, alumina-silica or the like carries a metal of Group VI of the Periodic Table such as molybdenum, tungsten or the like and a metal of Group VIII such as cobalt, nickel or the like have heretofore been employed. By the treatment, polycyclic aromatic compounds in the medium and heavy oil components are converted into partially hydrogenated aromatic compounds having a hydrogen-donating capacity such as tetralins, dihydroanthracenes, etc.

However, the noted conventional catalysts have a drawback that the solvent-hydrogenating capacity is insufficient and, in particular, the denitrogenation activity to the nitrogen components contained in the liquefaction and circulation solvent is insufficient. The nitrogen components consisting essentially of nitrogen gas are formed by the coal-liquefying reaction. As the nitrogen components do not have a hydrogen-donating capacity and a product-solubilizing capacity which are necessary for the coal liquefaction and circulation solvent, they often cause difficulty in stably operating the coal liquefaction for a long period of time. For this reason, a catalyst having an excellent denitrogenation activity capable of efficiently cleaving the carbon-nitrogen bond in the compounds contained in a coal liquefaction and circulation solvent having a high nitrogen content is desired.

SUMMARY OF THE INVENTION

The object of the present invention is to provide a hydrotreating catalyst for coal liquefaction and circulation solvents, which may efficiently remove the nitrogen components even from coals containing a large amount of nitrogen components and which are helpful for stable coal-liquefaction to be effected for a long period of time.

In order to attain the noted object, the present invention provides a catalyst for hydrotreating a coal liquefaction and circulation solvent, in which a carrier of γ-alumina carries at least one metal selected from metals of Group VI of the Periodic Table in an amount of from 15 to 25% by weight as the oxide thereof and at least one metal selected from metals of Group VIII in an amount of from 3 to 10% by weight as the oxide thereof, and the pore distribution as measured by mercury pressure porosimetry satisfies the conditions that the pores having a diameter falling within the range of from 40 to 600 Å have a mean diameter falling within the range of from 90 to 150 Å and the capacity of the pores having a diameter falling within the range of the mean diameter plus/minus 10 Å is 65% or more of the capacity of the pores having a diameter falling within the range of from 40 to 600 Å.

DETAILED DESCRIPTION OF THE INVENTION

γ-alumina is preferred as the carrier for use in the present invention. γ-alumina is obtained from an alumina hydrate which is called "pseudo-boehmite" by kneading, shaping, drying and firing the same. The alumina hydrate to be used as the carrier is obtained, for example, by dropwise adding sodium lauminate solution and sulfuric acid to a container simultaneously or almost simultaneously under the condition of a pH range of from 8 to 10 to form an alumina hydrate precipitate and thereafter ripening the resulting precipitate to uniformly grow the alumina hydrate crystal. In preparing the catalyst of the present invention, the alumina hydrate is employed as the carrier and accordingly the carrier has a pore distribution which is most preferred for the capacity of the catalyst. In accordance with the present invention, metals which are active for hydrotreating coal liquefaction and circulation solvents are carried on the carrier. As the active metals for the purpose, at least one selected from metals of Group VI of the Periodic Table in an amount of from 15 to 25% by weight as the oxide and at least one selected from metals of Group VIII in an amount of from 3 to 10% by weight as the oxide are employed. As the metal of Group VI is preferred molybdenum, and as the metal of Group VIII are/is preferred nickel and/or cobalt.

If the amounts of the active metals to be carried on the carrier are larger than the above-mentioned ranges, the capacity of the pores of the catalyst and the relative surface area thereof would decrease and the activity of the catalyst would thereby be lowered. In addition, such larger amounts are uneconomical and are undesirable. On the other hand, if the amounts are smaller than the noted ranges, the hydrotreating capacity and denitrogenation activity of the catalyst would be reduced.

In the catalyst of the present invention, the pore distribution condition is also extremely important. Specifically, it is necessary that the pores having a diameter effective for the hydrotreating capacity and the denitrogenation activity to coal liquefaction and circulation solvents are as many as possible and that the mean pore diameter falls within a particularly defined range. The indispensable conditions for the pore structure are as follows, with respect to the pore distribution as measured by mercury pressure porosimetry: The pores having a diameter falling within the range of from 40 to 600 Å have a mean diameter of from 90 to 150 Å and the capacity of the pores having a diameter falling within the range of the mean diameter plus/minus 10 Å is 65% or more of the capacity of the pores having a diameter falling within the range of from 40 to 600 Å. Where the carrier has too many small pores having a small diameter, diffusive resistance of the reactants in the catalyst grains would be large and the hydrotreating capacity and the denitrogenation ability of the catalyst would thereby be poor. On the other hand, where the carrier has too many large pores having a large diameter, a large amount of the reactants would go into the large pores at a time so that the reaction at the inlet of the pores would be to excess, causing clogging of the pores with the carbonaceous substances deposited therearound and, as a result, the hydrotreating capacity and denitrogenation activity of the resulting catalyst would be reduced. For these reasons, the catalyst is required to have a particularly conditioned pore distribution where the pores having a diameter suitable for the reactant molecules amount to the most of the whole pores, for the purpose of attaining the intended object. Specifically, the suitable pores are those having a mean diameter of from 90 to 150 Å. The control for centralizing the pore distribution in the mean pore diameter of a desired value may be effected in manufacture of the above-mentioned alumina hydrate, whereupon the reaction temperature is maintained within the range of from 60° to 80° C., the sodium aluminate solution and sulfuric acid are dropwise added to the reactor simultaneously or almost simultaneously under a pH range of from 8 to 10 and the reactants-dropping time is properly adjusted (increased or decreased). The thus-obtained alumina hydrate gel is kneaded in a kneader under heat to form a paste having a concentration of from 35 to 40% by weight as $Al_2O_3$, the paste is shaped by extrusion from an extruder having a die with a desired shape, and the shaped body is dried at a temperature of 80° to 120° C. and then fired at a temperature of 450° to 700° C. to obtain the intended carrier.

Where the active components are carried on the carrier, a dipping solution is first prepared from soluble metal salts such as chlorides or ammonium salts of metal(s) of Group VI of the Periodic Table and metal(s) of Group VIII thereof, and the carrier is dipped in the dipping solution by conventional methods such as one-liquid dipping method or two-liquid dipping method. After the active metals penetrated into the carrier, the carrier is dried, for example, at a temperature of 80° to 120° C., and then fired at a temperature of 400° to 600° C., whereby the catalyst composition of the present invention is obtained. Measurement of the pore distribution of the catalyst is effected by mercury pressure porosimetry, whereupon the contact angle of mercury to the catalyst is 140° and the surface tension is 480 dyn/cm$^2$, and all the pores are presumed to be cylindrical. The specific surface area is obtained by BET method where nitrogen gas is adsorbed to the carrier. The catalyst of the present invention can be employed under the same condition as that for other conventional catalysts. Precisely, in practical use, the catalyst of the present invention is filled in a reactor column, and medium and heavy oils to be obtained from a coal-liquefying step are introduced thereinto together with hydrogen and are reacted at a temperature of 340° to 400° C. and a pressure of 50 to 150 kg/cm$^2$. The liquid hourly space velocity (amount of oil introduced per unit period/amount of catalyst filled) is from 0.5 to 4.0 hr$^{-1}$; and the amount of hydrogen to be fed into the reactor column is, as a ratio to the solvent, suitably from 500 to 1000 N liter/liter. The thus treated circulation solvent may be re-circulated to the coal-liquefying step directly or after subjected to distillation to recover the light fraction.

The following examples are intended to illustrate the present invention in more detail but not to limit it in any way.

EXAMPLE (1) Preparation of Catalysts

Catalyst (A)

54 liters of water was added to a 130-liter stainless steel reactor equipped with a stirrer and heated up to 70° C. and allowed to stand as it was. Next, 15.9 kg of 9N-sulfuric acid solution and 13.0 kg of sodium luminate solution having a molar ratio of $Na_2O/Al_2O_3$ of being 1.56 and an $Al_2O_3$ concentration of being 18.4% were added thereto simultaneously or almost simultaneously over a period of 15 minutes with maintaining the pH range of being from 8.8 to 9.5, and then the whole was ripened for 60 minutes. In the procedure, the temperature of the slurry was kept at 70° C. The resulting alumina hydrate was gelled, re-dispersed and filtered, and the operation was repeated three times. Afterwards, the resulting product was kneaded in a kneader under heat and a plastic blend having an $Al_2O_3$ concentration of 37% by weight was obtained. The thus kneaded blend was shaped by extrusion from an extruder with a die having a diameter of 1.60 mm, dried at 110° C. for 18 hours and then fired for 2 hours in an electric furnace at 500° C. in an aerial atmosphere to o a catalyst carrier. The carrier was dipped in a solution containing ammonium molybdenate and nickel nitrate as dissolved in water, dried at 110° C. for 16 hours and then fired for 2 hours in an electric furnace at 500° C. in an aerial atmosphere to obtain a catalyst which is called Catalyst (A). The amounts of molybdenum and nickel as carried on Catalyst (A) were 15% by weight and 3% by weight, respectively, as their oxides ($MoO_3$ and NiO).

Catalyst (B)

The same catalyst carrier as that of Catalyst (A) was processed in the same manner as above, and a catalyst carrying molybdenum and nickel in an amount of 20% by weight and 4% by weight, respectively, as their oxides ($MoO_3$ and NiO) was obtained. This is called Catalyst (B).

Catalyst (C)

The catalyst carrier as that of Catalyst (A) was processed in the same manner as above, and a catalyst carrying molybdenum and nickel in an amount of 12% by weight and 3% by weight, respectively, as their oxides ($MoO_3$ and NiO) was obtained. This is called Catalyst (C).

Catalyst (D)

The same catalyst carrier as that of Catalyst (A) was processed in the same manner as above, and a catalyst carrying molybdenum and nickel in an amount of 15% by weight and 2% by weight, respectively, as their oxides ($MoO_3$ and $NiO$) was obtained. This is called Catalyst (D).

Catalyst (E)

The same catalyst carrier as that of Catalyst (A) was processed in the same manner as above, except that nickel nitrate was replaced by cobalt nitrate, and a catalyst carrying molybdenum and cobalt in an amount of 15% by weight and 3% by weight, respectively, as their oxides was obtained. This is called Catalyst (E).

Catalyst (F)

A carrier was prepared in the same manner as that for Catalyst (A), except that 9N-sulfuric acid and sodium aluminate solution having a molar ratio $Na_2O/Al_2O_3$ of 1.56 and an $Al_2O_3$ concentration of 18.4% were dropwise added simultaneously or almost simultaneously over a period of 5 minutes with maintaining the pH value to fall within the range of from 8.8 to 9.5. Next, molybdenum and nickel were carried on the resulting carrier in the same manner as mentioned above to give a catalyst carrying molybdenum and nickel in an amount of 20% by weight and 4% by weight, respectively, as their oxides. This is called Catalyst (F). Catalyst (G)

A carrier was prepared in the same manner as that for Catalyst (A), except that 9 N-sulfuric acid and sodium aluminate solution having a molar ratio $Na_2O/Al_2O_3$ of 1.56 and an $Al_2O_3$ concentration of 18.4% were dropwise added simultaneously or almost simultaneously over a period of 30 minutes with maintaining the pH value to fall within the range of from 8.8 to 9.5. Next, molybdenum and nickel were carried on the resulting carrier in the same manner as mentioned above to give a catalyst carrying molybdenum and nickel in an amount of 20% by weight and 4% by weight, respectively, as their oxides. This is called Catalyst (G).

Catalyst (H)

A carrier was prepared in the same manner as that for Catalyst (A), except that 9 N-sulfuric acid and sodium aluminate solution having a molar ratio $Na_2O/Al_2O_3$ of 1.56 and an $Al_2O_3$ concentration of 18.4% were dropwise added simultaneously or almost simultaneously over a period of 15 minutes with maintaining the pH value to fall within the range of from 8.8 to 9.5 and the alumina hydrate-containing slurry formed was ripened. Next, molybdenum and nickel were carried on the resulting carrier in the same manner as mentioned above to give a catalyst carrying molybdenum and nickel in an amount of 15% by weight and 3% by weight, respectively, as their oxides. This is called Catalyst (H).

The compositions and physical properties of these catalysts are shown in Table 1 below.

(2) Capacity of Catalyst

The capacity of each of the catalysts prepared as above was examined as mentioned below. First, 10 ml of the catalyst to be examined was filled in a cylindrical reactor column to form a fixed bed flow method reactor device, and a light oil to which 3% by weight of n-butylmercaptan was added was passed through the column for pre-sulfurization of the catalyst. For the sulfurization condition, the temperature was 300° C., the hydrogen pressure was 100 kg/cm$^2$, the liquid hourly space velocity was 1.0 hr$^{-1}$, and the ratio of hydrogen/sulfurized oil was 1000 N liter/liter, and the treatment was effected for 10 hours. Next, a coal-liquefied oil obtained by liquefaction of Monterey coal from America, which had the properties shown in Table 2 below, was passed through the reactor column together with hydrogen thereby to hydrotreat the oil. In the hydrotreatment, the reaction temperature was 340° C., the hydrogen pressure was 100 kg/cm$^2$, the liquid hourly space velocity was 1.0 hr$^{-1}$, and the ratio of hydrogen/sulfurized oil was 1000 N liter/liter, and the treatment was effected for 100 hours. 12 hours after beginning of introduction of the oil, the processed oil was sampled at intervals of 2 hours and the average samples gathered were examined on the aromatic index fa and the denitrogenation percentage. The results obtained are shown in Table 3 below.

The capacity of catalyst as shown in Table 3 indicates a relative capacity activity index based on the standard value of Catalyst (A) of being 100.

Table 3 demonstrates that Catalysts (C), (D), (F), (G) and (H) did not have sufficient hydrogenation activity and denitrogenation activity. This is because the amounts of the active metals as carried on the carrier were too small in Catalysts (C) and (D), the mean pore diameter was too small in Catalyst (F) and too large in Catalyst (G), and the pore distribution was not centralized in the optimum range in Catalysts (G) and (H).

TABLE 1

| | Compositions and Physical Properties of Catalysts | | | | |
|---|---|---|---|---|---|
| | Composition Kind of | Physical Properties | | | |
| Catalyst Code | Active Metal/ Amount Carried (%) | Surface Area (m$^2$/g) | Pore Capacity (ml/g) | Mean Pore Diameter (Å) | Distribution* (%) |
| A | Mo—Ni/15-3 | 246 | 0.59 | 110 | 70 |
| B | Mo—Ni/20-4 | 231 | 0.54 | 118 | 67 |
| C | Mo—Ni/12-3 | 250 | 0.61 | 108 | 69 |
| D | Mo—Ni/15-2 | 244 | 0.60 | 111 | 69 |
| E | Mo—Ni/15-3 | 243 | 0.59 | 112 | 70 |
| F | Mo—Ni/20-4 | 253 | 0.43 | 84 | 68 |
| G | Mo—Ni/20-4 | 182 | 0.56 | 158 | 58 |
| H | Mo—Ni/15-3 | 219 | 0.59 | 123 | 48 |

*Percentage of the integrated value of pores in the optimum pore diameter range of the pore distribution to the integrated value of pores in the total pore distribution.

TABLE 2

| Property of Coal-liquefied Oil Used as Crude Oil | |
|---|---|
| Aromatic Index (fa*) | 0.56 |
| Carbon | 87.8 wt. % |
| Hydrogen | 8.7 wt. % |
| Nitrogen | 0.54 wt. % |
| Sulfur | 0.12 wt. % |
| Fraction having boiling point of 350° C. or higher | 35.1 wt. % |

*Aromatic Index (fa) = $\dfrac{\text{Number of carbon atoms in aromatic ring in oil}}{\text{Number of total carbon atoms in oil}}$

TABLE 3

| Catalyst Code | Relative Capacity Active Index | | Notes |
| --- | --- | --- | --- |
| | Hydrogenation Activity (aromatic index) | Denitrogenation Percentage (%) | |
| A | 100 | 100 | Example of the Invention |
| B | 115 | 123 | Example of the Invention |
| C | 91 | 86 | Comparative Example |
| D | 88 | 87 | Comparative Example |
| E | 98 | 101 | Example of the Invention |
| F | 95 | 89 | Comparative Example |
| G | 93 | 92 | Comparative Example |
| H | 87 | 90 | Comparative Example |

As explained in detail in the above, the catalyst of the present invention is highly active for both hydrogenation and denitrogenation of coal-liquefying solvents and, in particular, it has an excellent denitrogenation capacity. Accordingly, using the catalyst of the present invention, liquefaction of coals having a large amount of nitrogen components may be conducted stably for a long period of time.

While the invention has been described in detail and with reference to specific embodiments thereof, it will be apparent to one skilled in the art that various changes and modifications can be made therein without departing from the spirit and scope thereof.

What is claimed is:

1. A catalyst for hydrotreating a coal liquefaction and circulation solvent, in which a carrier of gamma-alumina carries at least one selected from metals of Group VI of the Periodic Table in an amount of from 15 to 25% by weight as the oxide thereof and at least one selected from metals of Group VIII of the Periodic Table in an amount of from 3 to 10% by weight as the oxide thereof and the pore distribution as measured by mercury pressure porosimetry satisfies the conditions that the pores having a diameter falling within the range of from 40 to 600 Å have a mean diameter falling within the range of from 90 to 150 Å and the capacity of the pores having a diameter falling within the range of the mean diameter plus/minus 10 Å is 65% or more of the capacity of the pores having a diameter falling within the range of from 40 to 600 Å.

2. The catalyst as claimed in claim 1, in which the said carrier is one obtained from an alumina hydrate by kneading, shaping, drying and firing the same.

3. The catalyst as claimed in claim 1, in which the said metal of Group VI of the Periodic Table is molybdenum.

4. The catalyst as claimed in claim 1, in which the said metal of Group VIII of the Periodic Table is at least one selected from nickel and cobalt.

5. The catalyst as claimed in claim 1, in which the said metals are carried on the said carrier by impregnating the carrier in a solution containing soluble salts of the said metals, and drying and firing the resulting carrier.

6. The catalyst as claimed in claim 5, in which the said soluble salts are chlorides or ammonium salts of metals of Group VI and Group VIII of the Periodic Table.

* * * * *